(12) United States Patent
Song et al.

(10) Patent No.: US 12,480,170 B2
(45) Date of Patent: Nov. 25, 2025

(54) GRAIN-ORIENTED ELECTRICAL STEEL SHEET AND METHOD FOR MANUFACTURING SAME

(71) Applicant: POSCO, Pohang-si (KR)

(72) Inventors: Dae-Hyun Song, Gyeongsangbuk-do (KR); Junesoo Park, Gyeongsangbuk-do (KR); Sang-Woo Lee, Gyeongsangbuk-do (KR)

(73) Assignee: POSCO, Pohang-si (KR)

( * ) Notice: Subject to any disclaimer, the term of this patent is extended or adjusted under 35 U.S.C. 154(b) by 707 days.

(21) Appl. No.: 17/787,184

(22) PCT Filed: Dec. 9, 2020

(86) PCT No.: PCT/KR2020/017974
§ 371 (c)(1),
(2) Date: Jun. 17, 2022

(87) PCT Pub. No.: WO2021/125681
PCT Pub. Date: Jun. 24, 2021

(65) Prior Publication Data
US 2023/0028520 A1 Jan. 26, 2023

(30) Foreign Application Priority Data
Dec. 20, 2019 (KR) .......................... 10-2019-0172470

(51) Int. Cl.
| | | |
|---|---|---|
| C22C 38/00 | (2006.01) | |
| C21D 8/02 | (2006.01) | |
| C21D 8/12 | (2006.01) | |
| C21D 9/46 | (2006.01) | |
| C22C 38/04 | (2006.01) | |
| C22C 38/06 | (2006.01) | |
| C22C 38/26 | (2006.01) | |
| C22C 38/28 | (2006.01) | |
| C22C 38/34 | (2006.01) | |
| C22C 38/60 | (2006.01) | |

(52) U.S. Cl.
CPC ......... *C21D 8/0205* (2013.01); *C21D 8/0226* (2013.01); *C21D 8/0236* (2013.01); *C21D 8/0273* (2013.01); *C21D 8/1272* (2013.01); *C21D 9/46* (2013.01); *C22C 38/001* (2013.01); *C22C 38/002* (2013.01); *C22C 38/008* (2013.01); *C22C 38/04* (2013.01); *C22C 38/06* (2013.01); *C22C 38/26* (2013.01); *C22C 38/28* (2013.01); *C22C 38/34* (2013.01); *C22C 38/60* (2013.01); *C21D 2201/05* (2013.01)

(58) Field of Classification Search
CPC ..... C22C 38/001; C22C 38/004; C22C 38/02; C22C 38/26; C22C 38/34; C22C 38/48
See application file for complete search history.

(56) References Cited

U.S. PATENT DOCUMENTS

| | | | | |
|---|---|---|---|---|
| 2010/0158744 A1* | 6/2010 | Murakami | .............. | C22C 38/08 |
| | | | | 420/83 |
| 2012/0131982 A1* | 5/2012 | Imamura | ................. | C22C 38/06 |
| | | | | 72/362 |
| 2014/0137993 A1 | 5/2014 | Jamwal et al. | | |
| 2019/0112685 A1 | 4/2019 | Takenaka et al. | | |
| 2019/0233914 A1* | 8/2019 | Hayakawa | .............. | C21D 9/46 |
| 2019/0247902 A1 | 8/2019 | Ehashi et al. | | |

FOREIGN PATENT DOCUMENTS

| | | | | |
|---|---|---|---|---|
| CN | 1851023 | A | 10/2006 | |
| EP | 2140949 | A | 1/2010 | |
| EP | 3235914 | A1 | 10/2010 | |
| JP | S52-24116 | A | 2/1977 | |
| JP | H06-025747 | A | 2/1994 | |
| JP | H07-138641 | A | 5/1995 | |
| JP | 2012-112006 | A | 6/2012 | |
| JP | 2016-856 | A | 1/2016 | |
| JP | 2017-125260 | A | 7/2017 | |
| JP | 2018-505962 | A | 3/2018 | |
| KR | 10-2010-0060569 | A | 6/2010 | |
| KR | 10-2013-0014891 | A | 2/2013 | |
| KR | 10-2013-0056420 | A | 5/2013 | |
| KR | 10-1351955 | B1 | 1/2014 | |
| KR | 10-2014-0128923 | A | 11/2014 | |
| KR | 10-1538777 | B1 | 7/2015 | |
| KR | 10-1633255 | B1 | 7/2016 | |
| KR | 10-2018-0072106 | A | 6/2018 | |
| KR | 1020200035755 | A * | 4/2020 | ........... C21D 8/1222 |
| WO | 1998-002591 | A | 1/1998 | |
| WO | 2008133337 | A | 7/2010 | |

OTHER PUBLICATIONS

Extended European Search Report issued Jun. 29, 2023 for corresponding European Patent Application No. 20902389.4.
International Search Report (with partial English translation) and Written Opinion dated Jun. 2, 2021 issued in International Patent Application No. PCT/KR2020/017974.

(Continued)

*Primary Examiner* — Vanessa T. Luk
(74) *Attorney, Agent, or Firm* — Morgan Lewis & Bockius LLP

(57) ABSTRACT

A method for manufacturing a grain-oriented electrical steel sheet according to an embodiment of the present invention comprises the steps of: hot-rolling a slab to prepare a hot-rolled sheet, the slab containing, in wt %, 2.0 to 6.0% of Si, 0.04 to 0.12% of Mn, 0.001 to 0.022% of N, 0.027 to 0.060% of C, 0.01 to 0.08% of Nb, 0.01% or less of Ti, and the balance of Fe and other inevitable impurities; cold-rolling the hot-rolled sheet to prepare a cold-rolled sheet; and subjecting the primarily recrystallization-annealed cold-rolled sheet to secondary recrystallization annealing.

2 Claims, No Drawings

(56) References Cited

OTHER PUBLICATIONS

Office Action & Search Report issued in Chinese Patent Application No. 202080089022.3 dated Mar. 16, 2023.
Office Action issued Aug. 1, 2023 for corresponding Japanese Patent Application No. 2022-538196.

* cited by examiner

GRAIN-ORIENTED ELECTRICAL STEEL SHEET AND METHOD FOR MANUFACTURING SAME

CROSS-REFERENCE OF RELATED APPLICATIONS

This application is the U.S. National Phase under 35 U.S.C. § 371 of International Patent Application No. PCT/KR2020/017974, filed on Dec. 9, 2020, which in turn claims the benefit of Korean Application No. 10-2019-0172470, filed on Dec. 20, 2019, the entire disclosures of which applications are incorporated by reference herein.

TECHNICAL FIELD

An embodiment of the present invention relates to a grain-oriented electrical steel sheet and a method for manufacturing the same. Specifically, an embodiment of the present invention relates to a grain-oriented electrical steel sheet having excellent magnetism using (Nb,Ti)CN precipitates as a main inhibitor by appropriately adding Ti and Nb, and a method for manufacturing the same.

BACKGROUND ART

A grain-oriented electrical steel sheet is a soft magnetic material having excellent magnetic properties in one direction or a rolling direction since a texture of a steel sheet with respect to a rolling direction exhibits a Goss texture, which is {110}<001>. In order to express this texture, only grains with the Goss texture are allowed to grow, and a normal growth of grains with different textures needs to be inhibited as much as possible. The phenomenon that only the specific grain as described above grows is referred to as abnormal grain growth or secondary recrystallization. For the secondary recrystallization of grains with the Goss texture, a grain growth inhibitor such as a precipitate or segregation element that inhibits the growth of other grains is required.

Technologies for improving the magnetism of the grain-oriented electrical steel sheet may be divided into two categories: making a lot of Goss-oriented grains and obtaining a secondary recrystallization structure formed of high-density Goss-oriented grains by improving grain growth inhibitory power. Al-based nitride, Mn-based sulfide, or MnSe are mainly used as precipitates for imparting the grain growth inhibitory power to be described later. However, in order to use precipitates, such as Al-based nitride, Mn-based sulfide, or MnSe, as the grain growth inhibitor, fine dispersion precipitation of precipitates after hot rolling is essential, and therefore, it is necessary to keep a steel slab at high temperature for a long time. In this case, low-melting-point fayalite ($Fe_2SiO_4$) present in a scale layer of the steel slab is melted, thereby causing a problem in that life of a heating furnace is shortened and a long and expensive maintenance is required. In addition, since the precipitates re-dissolved at a high temperature and precipitated are very fine, there is a problem of making a primary recrystallization size fine due to strong grain growth inhibitory power. In order to grow grains to an appropriate size, a primary recrystallization annealing temperature which is high temperature is required, and a phenomenon in which a surface quality of a final product deteriorates due to high temperature oxidation frequently occurs.

In addition to these precipitates, it has been proposed to use precipitates such as BN or TiN by adding B and Ti, but since a trace of B is added, there is a problem in that it is very difficult to control in a steelmaking stage, and since coarse BN is easily formed in steel after addition, there is a problem in that the grain growth inhibitory power is weakened. In addition, since Ti easily forms TiN or TiC, Ti remains in the steel sheet even after high-temperature annealing and prevents magnetic domain transfer, which acts as a factor of increasing a core loss and lowering a magnetic flux density.

DISCLOSURE

Technical Problem

The present invention provides a grain-oriented electrical steel sheet and a method for manufacturing the same. Specifically, an embodiment of the present invention provides a grain-oriented electrical steel sheet having excellent magnetism using (Nb,Ti)CN precipitates as a main inhibitor by appropriately adding Ti and Nb, and a method for manufacturing the same.

Technical Solution

An exemplary embodiment of the present invention provides a method for manufacturing a grain-oriented electrical steel sheet, including: hot-rolling a slab to prepare a hot-rolled sheet, the slab containing, in wt %, 2.0 to 6.0% of Si, 0.04 to 0.12% of Mn, 0.001 to 0.022% of N, 0.027 to 0.060% of C, 0.01 to 0.08% of Nb, 0.01% or less of Ti, and the balance of Fe and other inevitable impurities; cold-rolling the hot-rolled sheet to prepare a cold-rolled sheet; subjecting the cold-rolled sheet to primary recrystallization annealing; and subjecting the primarily recrystallization-annealed cold-rolled sheet to secondary recrystallization annealing.

The primarily recrystallization-annealed cold-rolled sheet may contain, in wt %, 0.0010 to 0.0220% of N.

The slab may further contain, in wt %, at least one of 0.008% or less of S, 0.005% to 0.04% of P, 0.01% to 0.07% of Sn, 0.005% to 0.05% of Sb, 0.01 to 0.2% of Cr, and 0.04% or less of acid soluble Al.

The slab may further contain, in wt %, 0.020% of acid-soluble Al.

The primarily recrystallization-annealed cold-rolled sheet may satisfies Expression 1 below $$3.0 \leq ([Nb]+5\times[Ti])/(10\times[N])^2 \leq 100.0 \quad \text{[Expression 1]}$$

(In Expression, [Nb], [Ti], and [N] represent a content (wt %) of Nb, Ti and N in the primarily recrystallization-annealed cold-rolled sheet.)

The primarily recrystallization-annealed cold-rolled sheet may have an average particle size of precipitates of 30 nm or less.

The precipitate may contain Nb, Ti, or carbonitride of a combination thereof.

Another embodiment of the present invention provides a grain-oriented electrical steel sheet, including: in wt %, 2.0 to 6.0% of Si, 0.04 to 0.12% of Mn, 0.0001 to 0.006% of N, 0.005 wt % or less (excluding 0%) of C, 0.01 to 0.08% of Nb, and 0.01% or less of Ti, and the balance of Fe and other inevitable impurities.

The grain-oriented electrical steel sheet may include a precipitate, and an average particle size of the precipitate may be 30 nm or less.

The precipitate may contain Ti, Nb, or a composite thereof.

Advantageous Effects

According to a method for manufacturing a grain-oriented electrical steel sheet according to an embodiment of the present invention, it is possible to manufacture a grain-oriented electrical steel sheet having excellent magnetism by stably expressing secondary recrystallization of grains having a Goss texture using (Nb,Ti)CN precipitates as a main inhibitor.

MODE FOR INVENTION

The terms first, second, third, and the like are used to describe, but are not limited to, various parts, components, areas, layers and/or sections. These terms are used only to distinguish a part, component, region, layer, or section from other parts, components, regions, layers, or sections. Accordingly, a first part, a component, an area, a layer, or a section described below may be referred to as a second part, a component, a region, a layer, or a section without departing from the scope of the present disclosure.

Terminologies used herein are to mention only a specific exemplary embodiment, and do not to limit the present invention. Singular forms used herein include plural forms as long as phrases do not clearly indicate an opposite meaning. The meaning "including" used in the present specification concretely indicates specific properties, areas, integer numbers, steps, operations, elements, and/or components, and is not to exclude presence or addition of other specific properties, areas, integer numbers, steps, operations, elements, and/or components thereof.

When a part is referred to as being "above" or "on" other parts, it may be directly above or on other parts, or other parts may be included in between. In contrast, when a part is referred to as being "directly above" another part, no other part is involved in between.

All terms including technical terms and scientific terms used herein have the same meaning as the meaning generally understood by those skilled in the art to which the present invention pertains unless defined otherwise. All terms including technical terms and scientific terms used herein have the same meaning as the meaning generally understood by those skilled in the art to which the present invention pertains unless defined otherwise.

In addition, unless otherwise specified, % means wt %, and 1 ppm is 0.0001 wt %.

In an embodiment of the present invention, further containing additional elements means that the balance of iron (Fe) is replaced and contained as much as the additional amount of the additional elements.

Hereinafter, an exemplary embodiment of the present invention will be described in detail so that a person of ordinary skill in the art to which the present invention pertains can easily implement the present invention. As those skilled in the art would realize, the described embodiments may be modified in various different ways, all without departing from the spirit or scope of the present invention.

In the embodiment according to the present invention, grain growth is inhibited by using (Nb, Ti)CN as a main inhibitor of the grain growth, without using Al-based nitride or Mn-based sulfide or MnSe as the main inhibitor of the grain growth, thereby manufacturing a grain-oriented electrical steel sheet that has excellent magnetism while stably expressing secondary recrystallization of grains having a Goss texture.

An exemplary embodiment of the present invention provides a method for manufacturing a grain-oriented electrical steel sheet, including: hot-rolling a slab to prepare a hot-rolled sheet, the slab containing, in wt %, 2.0 to 6.0% of Si, 0.04 to 0.12% of Mn, 0.001 to 0.022% of N, 0.027 to 0.060% of C, 0.01 to 0.08% of Nb, 0.01% or less of Ti, and the balance of Fe and other inevitable impurities; cold-rolling the hot-rolled sheet to prepare a cold-rolled sheet; subjecting the cold-rolled sheet to primary recrystallization annealing; and subjecting the primarily recrystallization-annealed cold-rolled sheet to secondary recrystallization annealing.

Hereinafter, each step will be described in detail.

First, a hot-rolled sheet is manufactured by hot-rolling the slab.

The slab contains, in wt %, 2.0 to 6.0% of Si, 0.04 to 0.12% of Mn, 0.0001 to 0.022% of N, 0.005 wt % or less (excluding 0.027 t) of C, 0.01 to 0.08% of Nb, and 0.01% or less of Ti, and the balance of Fe and other inevitable impurities.

Hereinafter, the reason for limiting an amount for each element added will be described.

Si: 2.0 to 6.0 wt %

Silicon (Si) is a basic composition of electrical steel sheet, and serves to increase a specific resistance of a material and lower a core loss. When the content of Si is too small, the specific resistance decreases and an eddy current loss increases, and hot-rolled sheet grains become too coarse and precipitates are non-uniformly precipitated, thereby making secondary recrystallization unstable as well as increasing an occurrence frequency of edge cracks or plate fractures during rolling. Meanwhile, when Si is added too much, brittleness increases sharply and toughness decreases, so, during the rolling process, the edge cracks or plate fractures are intensified, and weldability between plates is deteriorated, and the content of C required to control a γ-phase fraction increases sharply, so decarburization is deteriorated or secondary recrystallization is unstable, thereby seriously damaging magnetism. Therefore, Si is contained in an amount of 2.0 to 6.0 wt %. More specifically, Si may be contained in an amount of 2.0 to 4.5 wt %.

Mn: 0.04 to 0.12 wt %

Manganese (Mn) has an effect similar to Si. That is, manganese (Mn) reduces a total core loss by increasing a specific resistance and reducing an eddy current loss. In addition, manganese reacts with S in a steel alloy state to form Mn-based sulfide, which is also used as a grain growth inhibitor, and manganese causes austenite phase transformation at a temperature above a certain temperature, thereby making a microstructure of a hot-rolled sheet uniform. In an embodiment of the present invention, by minimizing the formation of the Mn-based sulfide, the Mn-based sulfide inhibits its use as an inhibitor to the greatest extent possible. When Mn is contained too little, the hot-rolled sheet microstructure is non-uniformly formed, thereby making secondary recrystallization unstable and deteriorating magnetism. When Mn is contained too much, a large amount of Mn-based sulfide may be formed, and thus, the Mn-based sulfide may act as an inhibitor. Accordingly, Mn may be contained in an amount of 0.04 to 0.12 wt %. More specifically, Mn may be contained in an amount of 0.05 to 0.10 wt %.

N: 0.001 to 0.022 wt %

Nitrogen (N) is an important element that reacts with Si, Nb, Ti, and C to form $Si_3N_4$ and (Nb,Ti)CN. In an embodiment of the present invention, since nitrogen may be supplemented through a nitriding step, there is no need to contain a large amount of nitrogen in the slab. Therefore, the slab may contain 0.001 to 0.022 wt % of N.

When N is contained too little, N may react with Si, so only $Si_3N_4$ may be formed and (Nb,Ti)CN may not be formed. More specifically, the slab may contain 0.0020 to 0.0100 wt % of N. More specifically, Mn may be contained in an amount of 0.0030 to 0.0060 wt %.

After primary recrystallization annealing to be described later, N may be contained in an amount of 0.0010 to 0.0220 wt %. After the primary recrystallization annealing, when N is contained too little, an embodiment of the present invention, it is not possible to properly form the desired (Nb,Ti) CN. After the primary recrystallization annealing, when N is contained too much, (Nb,Ti)CN becomes very coarse and precipitates remain even after the secondary recrystallization annealing, thereby deteriorating magnetism. Therefore, after the primary recrystallization annealing, nitrogen may be contained in an amount of 0.0010 to 0.0220 wt %. More specifically, after the primary recrystallization annealing, N may be contained in an amount of 0.0010 to 0.0150 wt %. More specifically, after the primary recrystallization annealing, N may be contained in an amount of 0.0030 to 0.0130 wt %.

In the secondary recrystallization annealing process, N is partially removed, and N remaining in the final prepared grain-oriented electrical steel sheet may be contained in an amount of 0.0001 to 0.006 wt %.

C: 0.027 to 0.060 wt %

Carbon (C) is an important element that reacts with Si, Nb, Ti, and N to form SiC and (Nb, Ti)CN, and at the same time, an austenite stabilization element that causes austenite phase transformation at 800° C. or higher, thereby refining coarse grains in columnar crystals and the hot-rolled sheet in a casting process. When too little C is contained in the slab, C may react preferentially with Si, so only SiC may be formed and (Nb, Ti)CN may not be properly formed. Conversely, when too much C is formed in the slab, NbC and TiC with a fairly high melting point are strongly formed, so (Nb, Ti)CN may not be properly formed, and even after the secondary recrystallization annealing, NbC and TiC may remain and the magnetism may deteriorate. Accordingly, C in the slab may be contained in an amount of 0.027 to 0.060 wt %. More specifically, C may be contained in an amount of 0.035 to 0.055 wt %.

Meanwhile, the content of C remaining in the grain-oriented electrical steel sheet finally manufactured by decarburization in the primary recrystallization annealing and secondary recrystallization annealing processes may be 0.005 wt % or less. Specifically, the content of C remaining in the final manufactured grain-oriented electrical steel sheet may be 0.003 wt % or less.

Nb: 0.01 to 0.08 wt %

Niobium (Nb) forms carbide or nitride with a high melting point and remains even after the secondary recrystallization annealing to deteriorate the magnetism of the final grain-oriented electrical steel sheet, and as a result, is generally managed at a cryogenic temperature. However, in an embodiment of the present invention, Nb is a key element of the present invention because Nb is intended to be used as a grain growth inhibitor by being reversely used. That is, Nb is essential for precipitation of (Nb, Ti)CN, a strong grain growth inhibitor, by reacting with C, N, and Ti in the steelmaking, casting, and hot rolling steps. When Nb is contained too little, the secondary recrystallization becomes unstable by forming Nb(C,N), NbC, NbN, TiC, TiN, etc., and even after the secondary recrystallization annealing, some of the precipitates described above may remain inside the steel plate, thereby deteriorating magnetism. In addition, when Nb is contained too much, NbC and NbN having a high melting point are precipitated together with (Nb,Ti)CN and remain even after the secondary recrystallization annealing, thereby ultimately deteriorating magnetic properties. Therefore, the content of Nb may be 0.010 to 0.080 wt %. More specifically, the content of Nb may be 0.014 to 0.078 wt %.

Ti: 0.01 wt % or Less

Similar to Nb, titanium (Ti) generally forms carbide or nitride with a high melting point and remains even after secondary recrystallization annealing to deteriorate the magnetism of the final product, and as a result, is generally managed at a cryogenic temperature. However, in an embodiment of the present invention, Ti needs to be added to form (Nb,Ti)CN. When Ti is contained too much, the secondary recrystallization may be prevented by additionally forming Ti-based carbide or nitride, and ultimately remains in the product sheet, thereby deteriorating magnetism. Accordingly, Ti is contained in an amount of 0.01 wt % or less. When Ti is not contained in the steel at all, the reaction itself to form (Nb,Ti)CN becomes impossible, so 0 wt % is excluded. More specifically, Ti may be contained in an amount of 0.0010 to 0.0100 wt %. More specifically, Ti may be contained in an amount of 0.0050 to 0.0080 wt %.

The primarily recrystallization-annealed cold-rolled sheet may satisfies Expression 1 below $$3.0 \le ([Nb]+5\times[Ti])/(10\times[N])^2 \le 100.0 \qquad \text{[Expression 1]}$$

(In Expression, [Nb], [Ti], and [N] represent a content (wt %) of Nb, Ti and N in the primarily recrystallization-annealed cold-rolled sheet.)

In order to properly form (Nb,Ti)CN used as the main growth inhibitor in an embodiment of the present invention, Nb, Ti, and N may be adjusted within the above-described ranges. When the value of Expression 1 is too small, it means that either Nb or Ti is added too little or N is added too much, and (Nb,Ti)CN is not sufficiently formed, so the secondary recrystallization is unstable, thereby deteriorating the magnetism. Conversely, when the value of Expression 1 is too large, it means that either Nb or Ti is added too much or N is added too little. [(Nb,Ti)CN is very coarsely precipitated, so the grain growth inhibitory power is weakened and the secondary recrystallization becomes unstable, or NbC and TiC are formed in large quantities instead of (Nb,Ti)CN, and remain after the secondary recrystallization annealing, thereby deteriorating magnetism. More specifically, the value of Expression 1 may be 4.5 to 90.0.

The slab may further contain, in wt %, at least one of 0.008% or less of S, 0.005% to 0.04% of P, 0.01% to 0.07% of Sn, 0.005% to 0.05% of Sb, 0.01 to 0.2% of Cr, and 0.04% or less of acid soluble Al. More specifically, the slab may further contain, in wt %, 0.008% or less of S, 0.005% to 0.04% of P, 0.01% to 0.07% of Sn, and 0.01 to 0.2% of Cr.

S: 0.008 wt % or Less

When sulfur (S) is contained too much, a large amount of Mn-based sulfide is formed, and thus, the Mn-based sulfide acts as the grain growth inhibitor, thereby hindering the effect of (Nb,Ti)CN used as a main grain growth inhibitor in an embodiment of the present invention. In addition, the secondary recrystallization may also be unstable, and act to deteriorate magnetism. Therefore, when S is further contained, it is possible to actively inhibit S from being contained in steel. More specifically, S may be contained in an amount of 0.0010 to 0.0070 wt %.

P: 0.005% to 0.040 wt %

Phosphorus (P) may segregate at the grain boundary and interfere with the movement of the grain boundary, and at the same time, may play an auxiliary role in inhibiting the grain growth and improving {110}<001> texture in terms of microstructure, and as a result, may be further added. When the content of P is too small, the effect of addition may not be sufficient. When the content of P is too large, the brittleness may increase and the rollability may deteriorate significantly. Therefore, when P is further contained, P may be contained in amount of 0.005 to 0.040 wt %. More specifically, P may further be contained in an amount of 0.010 to 0.030 wt %.

Sn: 0.01% to 0.07 wt %

Similar to P, Tin (Sn) is a grain boundary segregation element and acts as a grain growth inhibitor because it is an element that interferes with the movement of the grain boundary, and as a result, may be further added. When Sn is added too little, the above-described effect may not be sufficiently obtained. Conversely, when Sn is added too much, it may be difficult to obtain the stable secondary recrystallization because the crystal grain growth inhibitory power is too strong. Therefore, when Sn is further contained, Sn may be contained in an amount of 0.01 to 0.07 wt %. More specifically, Sn may further be contained in an amount of 0.03 to 0.05 wt %.

Sb: 0.005 to 0.05 wt %

Similar to P and Sn, antimony (Sb) is a grain boundary segregation element and acts as a crystal grain growth inhibitor because it is an element that interferes with the movement of the grain boundary, and as a result, may be further added. When Sb is added too little, the above-described effect may not be sufficiently obtained. Conversely, when Sb is added too much, it may be difficult to obtain the stable secondary recrystallization because the crystal grain growth inhibitory power is too strong. Therefore, when Sb is further contained, Sb may be contained in amount of 0.005 to 0.05 wt %. More specifically, Sb may further be contained in an amount of 0.01 to 0.04 wt %.

Cr: 0.01 to 0.2 wt %

Chromium (Cr) is an effective element that forms a hard phase in the hot-rolled sheet to promote the formation of Goss texture during cold rolling, and to promote the formation of an oxide layer during decarburization annealing, and may be further added. When Cr is added too little, the above-described effect may not be sufficiently obtained. When Cr is added too much, Cr may promote the formation of a very dense oxide layer during the decarburization process, but deteriorate the formation of the oxide layer, and may inhibit even decarburization and nitridation. Therefore, when Cr is further contained, Cr may be contained in an amount of 0.01 to 0.20 wt %. More specifically, Cr may further be contained in an amount of 0.02 to 0.10 wt %.

Acid soluble Al: 0.04 wt % or less

Similar to Si, aluminum (Al) is an element having the effect of improving core loss by increasing specific resistance, and is an element used as a crystal grain growth inhibitor by forming Al-based nitride, but is not an essential element in one embodiment of the present invention. However, it can be additionally added to improve core loss or play an auxiliary role of (Nb,Ti)CN, which is a major crystal grain growth inhibitor. When Al is added too much, Al, Si, and Mn to form (Al,Si,Mn)N and AlN-based nitride to play the role of the strong crystal grain growth inhibitor, and as a result, interferes with the role of (Nb,Ti)CN, which is the main grain growth inhibitor and allows the primary grain size to be formed excessively and finely, thereby deteriorating magnetism. Accordingly, when Al is further contained, Al may be contained in an amount of 0.04 wt % or less. More specifically, Al may be further contained in an amount of 0.020 wt % or less. More specifically, Al may be further contained in an amount of 0.005 wt % or less. Acid soluble Al means Al that is dissolved in acid. Specifically, the Acid soluble Al means excluding Al, which is present in $Al_2O_3$, etc., which is not soluble in acid, from the total Al.

As the balance, iron (Fe) is contained. As the balance, inevitable impurities may be contained. The inevitable impurities mean impurities that are inevitably mixed in the manufacturing process of steelmaking and grain-oriented electrical steel sheet. Since the inevitable impurities are widely known, a detailed description thereof will be omitted. In an embodiment of the present invention, the addition of elements other than alloy components described above is not excluded, and may be contained in various ways without departing from the technical spirit of the present invention. When additional elements are contained, these elements are contained by replacing the balance of Fe. For example, it is possible to contain at least one of Cu, Ni, Mo, Zr, Bi, Pb, As, Ge, and Ga components in the steel within the component range of the present invention.

Returning to the description of the manufacturing process, the slab may be heated before hot rolling. When heating the slab, the heating of the slab is performed by being divided into a temperature at which the crystal grain growth inhibitor becomes incomplete solutionization or a temperature at which the crystal grain growth inhibitor becomes complete solutionization, but an embodiment of the present invention has no problem in expressing the effect of (Nb,Ti)CN regardless of the degree of solutionization, and therefore, the reheating temperature is not limited. Specifically, the slab may be heated at a temperature of 1100° C. to 1300° C. Since fayalite with a low melting point existing in a surface scale layer of the slab is melted during the heating of the slab and may damage a furnace body, the heating of the slab may be performed at a temperature of 1300° C. or lower.

The hot-rolled sheet is manufactured by hot-rolling the slab.

The hot rolling may be performed to a thickness of 1.0 to 5.0 mm.

In the hot-rolled steel sheet, by recrystallizing the deformed structure hot rolled in the hot rolled plate annealing process, smooth rolling may be made to the final product thickness in the cold rolling process which is a post process. In general, the hot-rolled sheet annealing temperature may be maintained for a certain period of time by being heated to a temperature of 950° C. or higher for recrystallization. Next, it is cooled to a temperature at which the next cold rolling may be performed, and it does not matter which method of air cooling, water cooling, oil cooling, or furnace cooling is adopted. As described above, an appropriate time means appropriate conditions because there are various variables such as a size and length of a furnace, heating capacity, and heat capacity. The hot rolled plate annealing may be omitted if necessary.

Next, the cold-rolled sheet is manufactured by cold-rolling the hot-rolled sheet.

The hot-rolled sheet is subjected to pickling to remove the oxide layer on the surface of the steel sheet and then cold-rolled. The cold rolling is a process of lowering the thickness of the steel sheet to the thickness of the final product, and is rolled to the thickness of the final product by performing one or more cold rolling including intermediate annealing. There is no problem in expressing the effect even if the cold rolling is performed at room temperature or the cold rolling is performed in the form of naturally or artificially heated plates.

The final thickness after the cold rolling may be 0.10 mm to 0.50 mm.

Next, the cold-rolled sheet is subjected to the primary recrystallization annealing.

The primarily recrystallization annealing is performed on the cold-rolled sheet is performed in a mixed gas atmosphere in which nitrogen, hydrogen, and water are mixed for decarburization annealing including the recrystallization of the deformed cold-rolled structure. In addition, if necessary, nitriding in which nitrogen ions are introduced into the steel sheet using ammonia gas may be performed. There is no functional problem even if nitridation is performed simultaneously with decarburization annealing or is performed later.

According to an embodiment of the present invention, when only the content of N in the steel sheet may be controlled after the primary recrystallization annealing, (Nb, Ti)CN, which is the main grain growth inhibitor, is sufficiently formed, but when nitriding is performed, (Nb,Ti)CN may be additionally formed to strengthen the grain growth inhibitory power and improve the density of secondary recrystallization Goss-oriented grains, thereby further improving magnetic properties.

For the nitriding, the primary recrystallization annealing may be performed in the atmosphere containing ammonia gas. The primary recrystallization annealing temperature may be carried out in the temperature range of 750 to 900° C. When the temperature is too low, ammonia gas is not decomposed, so nitrogen ions may not be introduced into the steel sheet and discharged out of the annealing furnace. Conversely, when the temperature is too high, the ammonia gas may be decomposed in advance before nitrogen ions are introduced into the steel sheet, thereby causing a problem in that the nitriding efficiency deteriorates. The annealing time of the primary recrystallization annealing is not a major problem to exert the effect of the present invention, but in consideration of productivity, it is usually preferable to process within 5 minutes.

In the steel sheet on which the primary recrystallization annealing has been completed, the average particle size of precipitates may be 30 nm or less. The secondary recrystallization occurred stably only when the average particle size of the precipitate is smaller than 30 nm, and the secondary recrystallization was not properly expressed when the average particle size is larger than 30 nm, so the magnetic properties after the secondary recrystallization annealing may deteriorate. More specifically, the average particle size may be 5 to 27 nm. More specifically, the average particle size may be 10 to 25 nm.

The precipitate may include (Nb, Ti)CN used as a main grain growth inhibitor in an embodiment of the present invention. That is, the precipitate may contain Nb, Ti, or carbonitride of a combination thereof. In addition, the precipitate may contain Nb, Ti carbide, MnS, AlN, etc., which are inevitably formed as precipitates.

In order to form precipitates of appropriate particle size, the contents of Ti and Nb and the content of N after the primary recrystallization annealing are important. More specifically, Expression 1 may be satisfied.

Since the contents of Ti and Nb and the content of N after the primary recrystallization annealing have been described above, overlapping descriptions thereof will be omitted.

Next, the primarily recrystallization-annealed cold-rolled sheet is subjected to the secondary recrystallization annealing.

For the primarily recrystallization-annealed cold-rolled sheet, after applying an annealing separator based on MgO, the temperature is raised to 1000° C. or higher and the crack annealing is performed for a long time to cause the secondary recrystallization, thereby forming a Goss-oriented texture in which a {110} side of the steel sheet is parallel to a rolling surface, and a <001> direction is parallel to a rolling direction.

As C and N are removed in the secondary recrystallization annealing process, (Nb, Ti)CN precipitates are decomposed and some of Nb and Ti are diffused into a base coating layer or remain inside the matrix. Therefore, the number of precipitates after the secondary recrystallization annealing is significantly reduced compared to the number of precipitates after the primary recrystallization annealing. However, since Nb and Ti remaining inside the matrix are not decomposed during the high-temperature annealing and are diffused to other (Nb,Ti)CN remaining to coarsen the particle size of this (Nb,Ti)CN, in the case of precipitates remaining even after the secondary recrystallization annealing, after the primary recrystallization annealing, the particle size does not change greatly.

That is, the average particle size of the precipitates after the secondary recrystallization annealing may be 30 nm or less. More specifically, the average particle size may be 5 to 27 nm. More specifically, the average particle size may be 10 to 25 nm.

The remaining precipitates may include Nb, Ti, or a combination thereof. After the secondary recrystallization annealing, as C and N are removed, C and N are removed from the carbonitride, so the precipitates may remain in the form of carbides or nitrides. The precipitates may remain in the form of carbonitride.

Another embodiment of the present invention provides a grain-oriented electrical steel sheet, including: in wt %, 2.0 to 6.0% of Si, 0.04 to 0.12% of Mn, 0.0001 to 0.006% of N, 0.005 wt % or less (excluding 0%) of C, 0.01 to 0.08% of Nb, and 0.01% or less of Ti, and the balance of Fe and other inevitable impurities.

The grain-oriented electrical steel sheet may include a precipitate, and an average particle size of the precipitate may be 30 nm or less. More specifically, the average particle size may be 5 to 27 nm.

The precipitate may contain Ti, Nb, or a composite thereof. More specifically, the precipitate may include Ti, Nb, or a carbide, nitride, or carbonitride including a combination thereof.

The grain-oriented electrical steel sheet according to an embodiment of the present invention is particularly excellent in core loss and magnetic flux density characteristics. The grain-oriented electrical steel sheet according to the embodiment of the present invention may have a magnetic flux density $B_6$ of 1.88 T or more, and a core loss $W_{17/50}$ of 1.05 W/kg or less. In this case, the magnetic flux density $B_8$ is a magnitude (Tesla) of the magnetic flux density induced under a magnetic field of 800 A/m, and the core loss $W_{17/50}$ is the magnitude (W/kg) of the core loss induced under the conditions of 1.7 Tesla and 50 Hz.

Hereinafter, specific examples of the present invention will be described. However, the following examples are only specific examples of the present invention, and the present invention is not limited thereto.

Example 1

In wt %, 3.28% of Si, 0.051% of C, 0.006% of S, 0.003% of N, 0.044% of Sn, 0.028% of P, 0.02% of Cr, 0.08% of Mn, 0.012% of Al were basic compositions, and the contents of Nb and Ti were changed as shown in Table 1, and the slab containing the remaining components, that is, the balance of Fe and other inevitable impurities were heated to a temperature of 1210° C. and then hot-rolled to a thickness of 3.0 mm. The hot-rolled sheet was heated to a temperature of 1000° C., maintained for 130 seconds, water cooled and pickled, and then and then rolled once to a thickness of 0.30 mm. The cold-rolled sheet was maintained at a temperature of 820° C. for 150 seconds in the mixed gas atmosphere of humid hydrogen, nitrogen, and ammonia, and was subjected to the decarburization annealing including the primary recrystallization annealing and the nitriding to change the content of nitrogen as shown in Table 1. The steel sheet was applied with MgO, which is an annealing separator, and subjected to the secondary recrystallization annealing which was performed in a mixed atmosphere of 25 vol % nitrogen and 75 vol % hydrogen up to 1180° C., was maintained in a 100% by volume hydrogen atmosphere for about 4 hours after reaching 1180° C., and then subjected to furnace cooling. The average size of the precipitate was measured by making a replica specimen for a specimen on which the primary recrystallization annealing was completed, and performing image analysis from a photograph taken through TEM.

As described above, Table 1 showed the contents of Nb, Ti, and nitrogen of the steel sheet after the secondary recrystallization annealing, the average size of (Nb,Ti)CN precipitates, and the magnetic properties measured after the secondary recrystallization annealing.

precipitates are coarsely formed, and the magnetic flux density and core loss deteriorate.

Meanwhile, Comparative Material 3 does not satisfy Expression 1, so it can be seen that the precipitates are coarsely formed, and the magnetic flux density and core loss deteriorate.

Comparative Materials 4 to 6 contain too little Nb and too much Ti, and does not satisfy Expression 1, so it can be seen that the precipitates are coarsely formed, and the magnetic flux density and core loss deteriorate.

Comparative Material 7 contains too much Ti and does not satisfy Expression 1, so it can be seen that the precipitates are coarsely formed, and the magnetic flux density and core loss deteriorate.

The present invention is not limited to the exemplary embodiments, but may be manufactured in a variety of different forms, and those of ordinary skill in the art to which the present invention pertains will understand that the present invention may be implemented in other specific forms without changing the technical spirit or essential features of the present invention. Therefore, it should be understood that the above-described implementation example and/or exemplary embodiments are exemplary in all aspects but are not limited thereto.

TABLE 1

| Nb (wt %) | Ti (wt %) | N (wt %) | Expression 1 | Average size of (Nb, Ti)CN precipitates (nm) | Core loss ($W_{17/50}$) | Magnetic flux density $B_8$ | Remarks |
|---|---|---|---|---|---|---|---|
| 0.005 | 0.015 | 0.0027 | 109.74 | 44 | 1.44 | 1.72 | Comparative Material 1 |
| 0.079 | 0.006 | 0.0050 | 43.6 | 26 | 1.05 | 1.88 | Inventive Material 1 |
| 0.078 | 0.016 | 0.0028 | 201.53 | 46 | 1.34 | 1.81 | Comparative Material 2 |
| 0.048 | 0.007 | 0.0130 | 4.91 | 23 | 1.00 | 1.91 | Inventive Material 2 |
| 0.068 | 0.006 | 0.0020 | 245 | 47 | 1.32 | 1.8 | Comparative Material 3 |
| 0.016 | 0.005 | 0.0030 | 45.56 | 22 | 0.92 | 1.93 | Inventive Material 3 |
| 0.005 | 0.018 | 0.0024 | 164.93 | 53 | 1.55 | 1.73 | Comparative Material 4 |
| 0.041 | 0.008 | 0.0030 | 90 | 5 | 0.94 | 1.95 | Inventive Material 4 |
| 0.009 | 0.014 | 0.0021 | 179.14 | 54 | 1.85 | 1.66 | Comparative Material 5 |
| 0.034 | 0.008 | 0.0100 | 7.4 | 18 | 0.96 | 1.92 | Inventive Material 5 |
| 0.006 | 0.020 | 0.0010 | 1060 | 58 | 1.52 | 1.74 | Comparative Material 6 |
| 0.014 | 0.005 | 0.0090 | 4.81 | 13 | 0.99 | 1.89 | Inventive Material 6 |
| 0.065 | 0.017 | 0.0017 | 519.03 | 49 | 1.54 | 1.63 | Comparative Material 7 |
| 0.016 | 0.007 | 0.0050 | 20.4 | 19 | 0.98 | 1.90 | Inventive Material 7 |

As shown in Table 1, it can be seen that the magnetic flux density and core loss are excellent when Nb, Ti, and N are properly contained after the primary recrystallization annealing.

On the other hand, Comparative Material 1 contains too little Nb and does not satisfy Expression 1, so it can be seen that the precipitates are coarsely formed, and the magnetic flux density and core loss deteriorate.

Meanwhile, Comparative Material 2 contains too much Ti and does not satisfy Expression 1, so it can be seen that the

What is claimed is:

1. A grain-oriented electrical steel sheet, comprising:
   in wt %, 2.0 to 6.0% of Si, 0.04 to 0.12% of Mn, 0.0001 to 0.006% of N, 0.005 wt % or less (excluding 0%) of C, 0.01 to 0.08% of Nb, and 0.01% or less, excluding 0%, of Ti, and the balance of Fe and other inevitable impurities, and
   a precipitate whose average particle size is 30 nm or less.

2. The grain-oriented electrical steel sheet of claim 1, wherein
the precipitate contains Ti, Nb, or a composite thereof.

\* \* \* \* \*